United States Patent
Mallow et al.

(10) Patent No.: US 7,419,942 B2
(45) Date of Patent: *Sep. 2, 2008

(54) EASILY DISPENSED, ANTI-TRACTION, MOBILITY DENIAL SYSTEM

(75) Inventors: William A. Mallow, deceased, late of Helotes TX (US); by Nancy J. Mallow, legal representative, Helotes, TX (US); Ronald J. Mathis, San Antonio, TX (US); Andrew Warren, Fredricksburg, VA (US); Christian J Schwartz, San Antonio, TX (US); Errol M. Brigance, San Antonio, TX (US); Kenneth R. Collins, Belcamp, MD (US); Nicholle K. Reinhardt, San Antonio, TX (US); Mary C. Marshall, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 401 days.

This patent is subject to a terminal disclaimer.

(21) Appl. No.: 10/684,427

(22) Filed: Oct. 15, 2003

(65) Prior Publication Data

US 2004/0059043 A1 Mar. 25, 2004

Related U.S. Application Data

(62) Division of application No. 10/315,208, filed on Dec. 10, 2002, now Pat. No. 7,067,464.

(60) Provisional application No. 60/338,654, filed on Dec. 11, 2001.

(51) Int. Cl.
 *C10M 173/00* (2006.01)
 *C10M 149/06* (2006.01)
 *B05D 5/08* (2006.01)

(52) U.S. Cl. .............. 508/471; 508/469; 508/507; 427/427.4

(58) Field of Classification Search .............. 427/427.4; 508/471
See application file for complete search history.

(56) References Cited

U.S. PATENT DOCUMENTS

| | | | |
|---|---|---|---|
| 3,562,192 A | 2/1971 | Leeks et al. | |
| 3,562,193 A | 2/1971 | Leeks et al. | |
| 3,983,213 A | 9/1976 | Lissant | |
| 4,069,186 A | 1/1978 | Ramig | |
| 4,450,197 A | 5/1984 | Hager et al. | |
| 4,541,947 A | 9/1985 | Clark et al. | |
| 4,606,913 A | 8/1986 | Aronson et al. | |
| 4,673,516 A | 6/1987 | Berry | |
| 4,781,847 A | 11/1988 | Weitz | |
| 5,190,679 A * | 3/1993 | McDonald | 508/178 |
| 5,209,860 A | 5/1993 | Trivett | |
| 5,258,424 A | 11/1993 | Yagi et al. | |
| 5,338,129 A | 8/1994 | Oden | |
| 5,470,498 A | 11/1995 | Pialet et al. | |
| 5,639,796 A | 6/1997 | Lee | |
| 6,031,041 A | 2/2000 | Chung et al. | |
| 6,034,041 A | 3/2000 | Nittel et al. | |
| 6,149,970 A * | 11/2000 | Frigge et al. | 427/154 |
| 6,197,382 B1 * | 3/2001 | Ornstein et al. | 524/544 |
| 6,242,489 B1 | 6/2001 | Pinney | |
| 7,067,464 B2 * | 6/2006 | Mallow et al. | 508/551 |

FOREIGN PATENT DOCUMENTS

| | | |
|---|---|---|
| DE | 1 644 976 | 10/1971 |
| DE | 25 54 082 A1 | 6/1977 |
| EP | 0 041 834 B1 | 8/1984 |
| EP | 0 341 577 A3 | 9/1990 |
| EP | 1 160 299 A1 | 12/2001 |
| FR | 2 753 986 A1 | 4/1998 |
| GB | 1 312 083 | 4/1973 |
| GB | 1 562 417 A | 3/1980 |
| JP | 02042351 A2 | 2/1990 |
| JP | A-6-293875 A | 10/1994 |
| WO | WO 91/15434 | 10/1991 |
| WO | WO 92/07924 | 5/1992 |
| WO | WO 98/51731 | 11/1998 |
| WO | WO 03/050192 A1 | 6/2003 |

OTHER PUBLICATIONS

Cytec Industries Inc.: " Superfloc Dry Polyacrylamide (PAM), anionic: A-100 Series" Aug. 8, 2003, XP002301616.

* cited by examiner

*Primary Examiner*—Ellen M. McAvoy
(74) *Attorney, Agent, or Firm*—Grossman Tucker et al.

(57) ABSTRACT

The present invention relates to a lubricious anti-traction material for effectively denying the mobility and access of personnel and vehicles to selected areas. The anti-traction material is composed of a slurry combined with water. The slurry is composed of an emulsion or dispersion and an anionic acrylamide polymer.

12 Claims, No Drawings

US 7,419,942 B2

EASILY DISPENSED, ANTI-TRACTION, MOBILITY DENIAL SYSTEM

This is a Divisional application of U.S. patent application Ser. No. 10/315,208, filed on Dec. 10, 2002 now U.S. Pat. No. 7,067,464, the contents of which are incorporated herein in its entirety.

The U.S. Government has a paid-up license in this invention and the right in limited circumstances to require the patent owner to license others on reasonable terms as provided by the terms of U.S. Government Contract No. V674-299F awarded by the United States Marine Corps.

BACKGROUND OF THE INVENTION

1. Field of Invention

The present invention relates to a lubricious anti-traction material for use in the control of crowds, riots, defense of positions (e.g., military applications) and the like, and to a method of making the same. The anti-traction material may be quickly and easily applied to deter the mobility and access of personnel and vehicles to restricted and/or defended areas.

2. Description of Related Art

Crowd and riot control is a concern for law officials at every level of government: local, national and international. Attempts at controlling unruly gatherings and defending selected areas from such crowds have resulted in physical and psychological injury to members of the law community and the crowds alike.

Typical attempts of crowd control often depend upon brute physical force to subdue and disperse crowds. Such physical force includes batons, rubber bullets, water cannons, kinetic energy rounds and the like. Such physical force has resulted in injuries to both crowd members and law enforcement officials, despite the use of riot gear or protective clothing, and often does not disperse unmanageable crowds.

Typically, disruptive riots occur on public streets or guarded prisons, wherein additional participants gather as the crowd moves towards its main objective. Dispersing such crowds and limiting forward movement without the use of physical force is highly desired.

Non-lethal weapon systems now represent an important alternative for law enforcement officials and strategic defense purposes. Examples of non-lethal weapons include, but are not limited to, tear gas, flash grenades, acoustic guns, sticky foams, snare nets, stun guns, strobe lights, malodorants, etc.

In order to ensure the most desirable outcome in managing crowd control, it is desired that numerous alternatives to non-lethal weapons systems be available along a force continuum, such that a non-lethal weapon suitable for a particular application may be selected based upon the nature of the threat and level of provocation.

In the case of slowing and/or eliminating the forward progress of rowdy crowds, several non-lethal controls have been utilized. These controls range from barriers, tear gas, malodorants, sticky foams, etc. However, these typical non-lethal controls have disadvantages. For instance, crowd barriers can be bulky, require advance planning to move them into place, require large storage areas when not in use, and can be destroyed or used as weapons by the crowd members, etc. Typical barriers may also be besieged by vehicles driven by crowd members. Crowd controls such as tear gas and malodorants, although non-lethal, may still cause physiological and/or psychological injury to both law enforcement agents and crowd members. Further, tear gas and malodorants may not impede forward progress of determined rioters. Finally, sticky foams may be difficult to remove once the crowd has dispersed.

Thus, a non-lethal impedance for crowd movement is desired that does not require much storage space and can be moved into place with minimal forethought. A crowd control means is desired that impedes not only the movement of crowds on foot, but also crowds in motorized vehicles. Such a crowd control means should not induce significant physiological or psychological injury, nor be able to be used by the crowds against the law enforcement officials. Further, the crowd control means should cause little, if any, damage to the surrounding environment, and be easily removed once the crowd has been subdued and/or dispersed.

SUMMARY OF THE INVENTION

This invention identifies a composition for use as an anti-traction material that effectively deters the mobility and access of personnel and/or vehicles to areas that are to be defended or protected. It further immobilizes hostile crowds and enables authorities to constrain and apprehend unauthorized participants if desired.

The anti-traction material of the invention includes at least 1) a slurry of A) an anionic acrylamide polymer particle with B) an emulsion or dispersion of a polyacrylamide in a hydrocarbon that upon combination with 2) water, produces a very coherent, visco-elastic gel that resists vertical slump and displacement by gravitational forces and forces of foot and vehicle traffic. The water is combined with the slurry upon immediate application of the slurry to a targeted surface.

DETAILED DESCRIPTION OF PREFERRED EMBODIMENTS

The components and preferred ratios in the composition are defined below:

Component 1: an emulsion or dispersion containing a polyacrylamide in water and dispersed in an oil phase. This component may be a drilling head lubricant or drilling mud additive, and preferably is an emulsion of a polyacrylamide in water emulsified in a hydrocarbon (e.g., kerosene, petroleum distillates, vegetable oil, and mineral oil). Copolymers of polyacrylamides, polyacrylates, and polyacrylic acids work equally well, especially in an anionic form. Typical properties of this component include its "stickiness," "viscoelasticity" (its ability to return to its original shape after being displaced), its rapid gel time, and the fact that the polymer chains relax and swell upon hydration. Examples of preferred Component 1 polymers include CYDRIL 5300 (an anionic polyacrylamide in water-in-oil emulsion), SUPERFLOC N-1986 (a nonionic polyacrylamide in water-in-oil emulsion, and SUPERFLOC A-1885 RS (an anionic polyacrylamide in water-in-oil-emulsion), all from Cytec Industries. In a preferred embodiment, this component comprises about 75% of the two-part slurry, but can range from 60% to 80% and still be effective.

Component 2: an acrylic polymer particle, preferably an anionic acrylamide polymer powder, which is combined with component 1 to produce a slurry. The acrylic polymer particles are granular solids that range from 0.5 mm to 2.0 mm in size. Upon hydration, the viscosity of this component increases to form a gel-like substance. Examples of preferred Component 2 polymers include SUPERFLOC A-120, SUPERFLOC A-130, and SUPERFLOC A-150 HMW, all of which are anionic polyacrylamide flocculants from Cytec Industries. Another example is MAGNAFLOC 1011, a high molecular weight anionic polyacrylamide flocculant from Ciba Specialty Chemicals. In a preferred embodiment, the powder comprises about 25% of the slurry, but can range from 20% to 40% and still be effective.

Component 3: water. The water is preferably added to the dispensing slurry en route to the targeted surface at a preferred ratio of about 10 parts water to about one part slurry (volume or weight), or about 10 parts of slurry to about 100 parts of water. Water can be added in ratios as little as 5 parts water to one part slurry and ratios as high as 40 parts water to one part slurry.

Component 1 provides a very low coefficient of friction (less than 0.01), but by itself is not as effective at denying mobility to perseverant personnel or vehicles without the addition of the granular polymer powder. As both materials become hydrated, the emulsion becomes a sticky cohesive semi-fluid mass and the acrylic powder is held within that mass as a swollen particle that provides a propping effect that greatly limits mobility. Unlike wet ice, it is more difficult to adjust one's stride or velocity to prevent slipping and falling, regardless of footwear or treaded tires, especially on hard or compacted surfaces. On uncompacted surfaces and soils, cleated shoes, steel studded tires or tank treads may be able to possibly penetrate the film to a more trackable and passable and maneuverable condition, but not without difficulty and not without still having the progress significantly impaired due to the slippery conditions imparted by the anti-traction material.

One of the novel aspects of this invention is believed to lie in the surprising effectiveness of the combined materials (water, emulsion and swollen solids) that prevents mobility and access to controlled sites regardless of speed, footwear or vehicle wheel structures when applied to hard surfaces such as asphalt, concrete and compacted soils. It is equally effective on flat and sloping surfaces, as well as on grassy terrain, either mowed or heavily vegetated.

The anti-traction composition of the invention is preferably made by first forming a slurry of the emulsion and the polymer particle, and then subsequently combining it with the water component at the time of application. The emulsified polymer and the acrylic polymer particle are first combined to form a slurry by mixing the two components at the correct ratio. Mixing is accomplished by stirring the acrylic polymer particles into the emulsion. For small batches, this can be done using a paint stirrer, but for larger quantities, an electric or other type mixer may be required.

The anti-traction material may also comprise other components added into either the slurry and/or the emulsion as desired and/or needed. For example, malodorants, other noxious chemicals, colorants (e.g., to camouflage the material), etc. can also be added to either the slurry and/or emulsion. Preferably, such additional components are included in amounts that are effective without destroying the lubricious and/or stickiness properties of the anti-traction material. However, slight reductions in lubriciousness may be tolerated. It is also preferred that the additional components not destroy the environmental friendliness of the anti-traction material.

Once the slurry is prepared, water is added at a ratio of about 20 parts of water to about 1 part of slurry (by volume or by weight), when being applied to hard, smooth surfaces. On rough and/or uneven surfaces, the preferred ratio is about 10 parts of water to about 1 part of slurry.

Water is combined with the slurry upon immediate application to a targeted surface. If water is added to the slurry in the delivery system prior to dispensing, gellation and/or clogging of the parts of the delivery system most likely will occur. Since the water and slurry must be kept separated until dispensed, a special mixing nozzle is required that allows the two fluids to come together at the exit point of the system. Water can also be added to the slurry after the slurry has been applied to the targeted surface. This approach is especially useful when destruction of the surface (i.e. asphalt runway, road, etc.) is desirable. The slurry could be pre-mixed and stored in sealed containers until ready for use if so desired.

There are several means by which the anti-traction material may be delivered for use on hard surfaces. The anti-traction material can be pumped, sprayed, poured or even air-dropped to the desired location. In one embodiment, once the slurry is in place, water is added and the anti-traction property takes effect. The required thickness of the applied anti-traction material depends on several factors including the type of surface that it is being applied to (i.e. asphalt, wood, concrete, grass), the surface temperature, and the porosity of the surface. For example, for the anti-traction material to be effective on asphalt, a minimum thickness of 0.050" is required, whereas on tile, a minimum thickness of 0.028" is required.

The present invention may be used to slow or hinder the forward movement of others in several ways. First, the anti-traction material may be positioned in or around an area into which one desires to keep others from entering. It is preferred that in such circumstances that the anti-traction material be positioned on hard surfaces such as concrete, asphalt, compacted soils, etc.

When the anti-traction materials are positioned on such surfaces, one finds it extremely difficult, if not impossible, to enter into the restricted area over or through the anti-traction material because a person or vehicle is unable to obtain any traction or friction with the anti-traction material. As such, the person is unable to propel in any direction, forward, back, etc., since the force of friction between the body and the anti-traction material is so minute. The coefficient of friction between a body and the anti-traction material of the invention is less than 0.01. As a comparison, ice has a coefficient of friction of about 0.05.

In addition to disrupting the motion of a person, the anti-traction material obstructs motor and other, land-based vehicles from entering a restricted/defended area. Like the person on foot unable to propel himself because the force of friction is so minute between his body and the anti-traction material, a land-based vehicle is also unable to gain traction and cannot move through or over the anti-traction material. A material is deemed "untrafficable," or not navigable if the material has a coefficient of friction less than 0.05. The material has a coefficient of friction between the material and the vehicle of less than about 0.01.

Treads, regardless of the footwear or tires, do not overcome the anti-traction material wherein the anti-traction material is on a hard surface, e.g., concrete, asphalt, compacted soil, thus obstructing the movement of both persons and land-based vehicles.

It has been found that propelling oneself or another to "slide over" the anti-traction material may also result in the propelled person and/or object being coated with the anti-traction material. Thus, even if the propelled person or vehicle is able to advance through the anti-traction material application area, the person and/or vehicle still finds it difficult to maneuver thereafter as the anti-traction material coating still on the person/vehicle continues to hinder movement and/or grasping or holding of objects. This is especially true since the anti-traction material is not easily removed from the person or vehicle when the material is wet.

It is also not advantageous to build a "bridge" over the anti-traction material by laying materials, e.g., boards, other persons, etc., over the anti-traction material because the bridge materials will tend to slide out of position as the person/vehicle tries to cross over the bridge. If the bridge materials are not secured to an area not coated with the anti-traction material, the bridge materials will be forced to move in a direction opposite the force exerted by a person/vehicle moving across the bridge materials. This is because the person crossing the bridge must push off the bridge materials to move forward. However, if the bridge materials are not secured to an area not coated with the anti-traction material, the movement of the person/vehicle crossing the bridge will push the bridge materials away.

If the anti-traction material is dispensed on uncompacted surfaces, i.e., loose soils, there is a higher probability that a person and/or land vehicle might be able to gain enough traction depending on the tread of the footwear or tires. However, the material still hinders the person/vehicle's movement, albeit to a less significant degree than it would otherwise, but is still useful in limiting the movement of the person/vehicle.

The anti-traction material is not limited only to use on horizontal hard surfaces to impede movements by foot or by land vehicle. The anti-traction material may also be applied to sloped and/or vertical structures and regions due, in part, to the high cohesiveness of the material.

The anti-traction material may be most effective when it is distributed in a random pattern over a surface, thereby creating slippery and non-slippery surfaces. Such a random dispersement makes people even less sure of their steps if they attempt to cross the coated surface. This also reduces the effectiveness of people from running and sliding across the anti-traction material because of the randomness of the application and the carryover of material from a treated area to an untreated area via people's footwear.

The anti-traction material may further be placed on the surfaces of devices to keep others from utilizing them. For example, one could place a coating of the anti-traction material on windows, doorknobs, railings, stairways, entryways, etc. to restrict someone from entering or leaving an area.

It is particularly effective in preventing the scaling of walls and stairwells and makes doorknobs and railings impossible to grip. If sprayed on weapons, steering columns, tools and the like, their utility is impaired. Exceptional effort is required to remove the anti-traction material through hot water or high-pressure washing with copious amounts of water.

The material can be removed if desired (e.g., after accomplishing the goal of the use) by high-pressure water, hot or cold, and displaced from the targeted areas to peripheral sights. It dries to a sweepable film, but can be easily reconstituted to its original anti-traction state by reapplication of water thereto.

Among other things, the present invention thus provides:

(a) a slurry of an emulsified acrylic polymer in water// petroleum distillate with a granular anionic acrylamide, which, when combined with water, forms a viscous, highly lubricious, greatly displacement resistant film, which adheres to vertical as well as horizontal surfaces;

(b) a water-activated slurry which provides a non-displaceable, film/coating that impedes traffic;

(c) a renewable, anti-traction coating which after drying can be restored to its original function by the application of water;

(d) a mobility denial mixture that can be pumped, sprayed, poured or airdropped to the desired target areas;

(e) a coating that may be applied to walls, doors, windows, railings, steps, grass, concrete, asphalt, or dirt surfaces to impede movement of personnel or vehicles;

(f) a highly lubricious coating that can render tools, weapons, and any hand-operated device difficult or impossible to operate; and (g) a highly tenacious, lubricious coating that requires extraordinary means to remove: great volumes of water or water high pressure with or without heat.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention.

What is claimed is:

1. A method of producing a lubricious coating for reducing mobility over a target surface comprising:

forming an emulsion or dispersion in water of a polymer and dispersed in an oil phase selected from the group consisting of polyacrylamides, polyacrylates, polyacrylic acids, and copolymers thereof;

mixing the emulsion or dispersion with an acrylic or acrylamide polymer particles at a particle size of about 0.5 mm to 2.0 mm to form a slurry;

combining the slurry with water at 5-40 parts water to one part slurry by volume or weight; and coating at least a portion of said target surface with said lubricious coating, wherein the water is added to the slurry as the slurry is dispensed to said target surface and forming said viscous gel coating on said target surface.

2. A method of producing a lubricious coating for reducing mobility over a target surface comprising:

forming an emulsion or dispersion in water of a polymer and dispersed in an oil phase selected from the group consisting of polyacrylamides, polyacrylates, polyacrylic acids, and copolymers thereof;

mixing the emulsion or dispersion with an acrylic or acrylamide polymer particles at a particle size of about 0.5 mm to 2.0 mm to form a slurry;

combining the slurry with water at 5-40 parts water to one part slurry by volume or weight; and coating at least a portion of said target surface with said lubricious coating, wherein the water is added to the slurry after the slurry is dispensed to said target surface and forming said viscous gel coating on said target surface.

3. The method according to claim 1, wherein the emulsion or dispersion comprises about 75% of the slurry, and the acrylic or acrylamide polymer comprises about 25% of the slurry.

4. The method according to claim 1, wherein a ratio of the water to the slurry is about 20:1 by volume or by weight.

5. The method according to claim 1, wherein a ratio of the water to the slurry is about 10:1 by volume or by weight.

6. The method according to claim 2, wherein the emulsion or dispersion comprises about 75% of the slurry, and the acrylic or acrylamide polymer comprises about 25% of the slurry.

7. The method according to claim 2, wherein a ratio of the water to the slurry is about 20:1 by volume or by weight.

8. The method according to claim 2, wherein a ratio of the water to the slurry is about 10:1 by volume or by weight.

9. The method according to claim 1, wherein the emulsion or dispersion comprises about 60-80% of the slurry and the acrylic or acrylamide polymer comprises about 20-40% of the slurry.

10. The method according to claim 1 wherein the lubricious coating is formed at a thickness of at least 0.28 inches.

11. The method according to claim 2, wherein the emulsion or dispersion comprises about 60-80% of the slurry and the acrylic or acrylamide polymer comprises about 20-40% of the slurry.

12. The method according to claim 2 wherein the lubricious coating is formed at a thickness of at least about 0.28 inches.

* * * * *